United States Patent
Ochocinski et al.

(10) Patent No.: US 10,414,289 B2
(45) Date of Patent: Sep. 17, 2019

(54) METHOD TO CONDITION A BATTERY ON DEMAND WHILE OFF CHARGE

(71) Applicant: FORD GLOBAL TECHNOLOGIES, LLC, Dearborn, MI (US)

(72) Inventors: Christopher Adam Ochocinski, Canton, MI (US); Jaswant S. Dhillon, Canton, MI (US); Angel Fernando Porras, Dearborn, MI (US); Timothy Noah Blatchley, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 113 days.

(21) Appl. No.: 15/602,194

(22) Filed: May 23, 2017

(65) Prior Publication Data

US 2018/0339605 A1    Nov. 29, 2018

(51) Int. Cl.
| | |
|---|---|
| *H02J 7/00* | (2006.01) |
| *B60L 15/20* | (2006.01) |
| *B60L 53/14* | (2019.01) |
| *B60L 58/12* | (2019.01) |
| *B60L 58/24* | (2019.01) |
| *B60L 58/26* | (2019.01) |
| *B60L 58/27* | (2019.01) |

(52) U.S. Cl.
CPC ........... *B60L 15/2045* (2013.01); *B60L 53/14* (2019.02); *B60L 58/12* (2019.02); *B60L 58/24* (2019.02); *B60L 58/26* (2019.02); *B60L 58/27* (2019.02); *B60L 2240/545* (2013.01); *B60L 2260/52* (2013.01)

(58) Field of Classification Search
USPC ................................ 320/107, 108, 109, 110
See application file for complete search history.

(56) References Cited

U.S. PATENT DOCUMENTS

| | | | |
|---|---|---|---|
| 8,937,452 B2 | 1/2015 | Schwarz et al. | |
| 8,970,173 B2 | 3/2015 | Kelty et al. | |
| 2014/0266063 A1 | 9/2014 | Loftus | |
| 2014/0277869 A1* | 9/2014 | King | B60H 1/00278 |
| | | | 701/22 |
| 2015/0145480 A1 | 5/2015 | Yebka et al. | |

(Continued)

FOREIGN PATENT DOCUMENTS

| | | |
|---|---|---|
| CN | 103760493 | 4/2014 |
| CN | 2044888462 | 7/2015 |

(Continued)

*Primary Examiner* — Brian Ngo
(74) *Attorney, Agent, or Firm* — Carlson, Gaskey & Olds, P.C.

(57) ABSTRACT

A method according to an exemplary aspect of the present disclosure includes, among other things, conditioning a battery of an electrified vehicle while off charge in response to an operator request for improved performance as a tradeoff for decreased range. An electrified vehicle system according to an exemplary aspect of the present disclosure includes, among other things, a battery, an electric machine configured to receive electric power from the battery to drive vehicle wheels, and a system control that generates a control signal to condition the battery while off charge in response to an operator request for improved performance as a tradeoff for decreased range.

22 Claims, 2 Drawing Sheets

(56) References Cited

U.S. PATENT DOCUMENTS

| | | | |
|---|---|---|---|
| 2015/0197162 A1* | 7/2015 | Martin | B60L 11/1861 701/22 |
| 2015/0360578 A1* | 12/2015 | Duan | B60L 11/1861 340/455 |
| 2016/0288659 A1 | 10/2016 | Hammoud et al. | |
| 2017/0015208 A1 | 1/2017 | Dunlap et al. | |

FOREIGN PATENT DOCUMENTS

| KR | 20150034857 | 4/2015 |
|---|---|---|
| KR | 20160043736 | 4/2016 |

\* cited by examiner

METHOD TO CONDITION A BATTERY ON DEMAND WHILE OFF CHARGE

TECHNICAL FIELD

This disclosure relates to a method and system for an electrified vehicle where a battery may be conditioned while off charge in response to an operator request for improved performance as a tradeoff for decreased range.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery assemblies, or battery arrays, that include a plurality of interconnected battery modules comprised of battery cells. A power output of these high voltage batteries is a function of various factors, one of which is battery temperature. At extreme hot and cold ambient temperatures, the ability of the battery to charge and discharge may be limited. This issue becomes more critical with battery electric vehicles (BEVs) as there is no engine to compensate for the loss of battery power. Thus, the vehicle's performance and drivability can be reduced with these reductions of charge and discharge power limits.

SUMMARY

A method according to an exemplary aspect of the present disclosure includes, among other things, conditioning a battery of an electrified vehicle while off charge in response to an operator request for improved performance as a tradeoff for decreased range.

In a further non-limiting embodiment of the foregoing method, the method includes determining a state of the battery to determine an amount of energy required to bring the battery to a desired level of performance capability.

In a further non-limiting embodiment of either of the foregoing methods, the method includes comparing at least one of battery temperature and battery state of charge to a threshold to determine the state of the battery.

In a further non-limiting embodiment of any of the foregoing methods, the method includes estimating an impact to range based on the amount of energy required to bring the battery to the desired level of performance capability.

In a further non-limiting embodiment of any of the foregoing methods, the method includes communicating to the operator an estimated range available if the battery is conditioned to the desired level of performance capability.

In a further non-limiting embodiment of any of the foregoing methods, the estimating step includes defining a plurality of performance levels and estimating an impact to range for each performance level based on the amount of energy required to bring the battery to each performance level.

In a further non-limiting embodiment of any of the foregoing methods, the method includes communicating to the operator an estimated range available for each performance level.

In a further non-limiting embodiment of any of the foregoing methods, the method includes conditioning the battery in response to an affirmative operator request to have improved performance as a tradeoff for decreased range.

In a further non-limiting embodiment of any of the foregoing methods, the conditioning step includes heating or cooling the battery.

In a further non-limiting embodiment of any of the foregoing methods, the electrified vehicle comprises a battery electric vehicle or plug-in hybrid electric vehicle.

A method according to another exemplary aspect of the present disclosure includes, among other things: generating an operator prompt to allow an operator to approve conditioning a battery of an electrified vehicle for improved performance as a tradeoff for decreased range in response to a next usage or go time for the electrified vehicle, or in response to the electrified vehicle being off charge.

In a further non-limiting embodiment of any of the foregoing methods, the method includes determining a state of the battery to determine an amount of energy required to bring the battery to a desired level of performance capability.

In a further non-limiting embodiment of any of the foregoing methods, the method includes comparing at least one of a battery temperature and battery state of charge to a threshold to determine the state of the battery.

In a further non-limiting embodiment of any of the foregoing methods, the method includes estimating an impact to range based on the amount of energy required to bring the battery to the desired level of performance capability.

In a further non-limiting embodiment of any of the foregoing methods, the method includes communicating to the operator an estimated range available if the battery is conditioned to the desired level of performance capability.

In a further non-limiting embodiment of any of the foregoing methods, the method includes conditioning the battery in response to an affirmative operator request to have improved performance as a tradeoff for decreased range.

A system according to another exemplary aspect of the present disclosure includes, among other things: a battery, an electric machine configured to receive electric power from the battery to drive vehicle wheels, and a system control that generates a control signal to condition the battery while off charge in response to an operator request for improved performance as a tradeoff for decreased range.

In a further non-limiting embodiment of the foregoing system, the system includes an interface configured to allow the operator to communicate a usage schedule to the system control, and wherein the system control is configured to identify a next usage or go time, and if the next usage or go time is during an off charge condition, generate an operator prompt to allow the operator to select an increased performance mode as a tradeoff for decreased range.

In a further non-limiting embodiment of either of the foregoing systems, the system control determines a state of the battery to determine an amount of energy required to bring the battery to a desired level of performance capability, estimates an impact to range based on the energy requirement to condition the battery, and communicates to the operator an estimated range available if the battery is conditioned to the desired level of performance capability.

In a further non-limiting embodiment of any of the foregoing systems, the system includes a heating system and a cooling system wherein, in response to an operator selection of improved performance capability, the system control is configured to activate the heating or cooling system while off charge to place a temperature of the battery within a desired range to achieve the desired level of performance capability for the next usage or go time.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary methods of conditioning a battery for an electrified vehicle while off charge in response to an operator request for improved performance as a tradeoff for decreased range. These and other features are discussed in greater detail in the following paragraphs of this detailed description.

Figure 1:
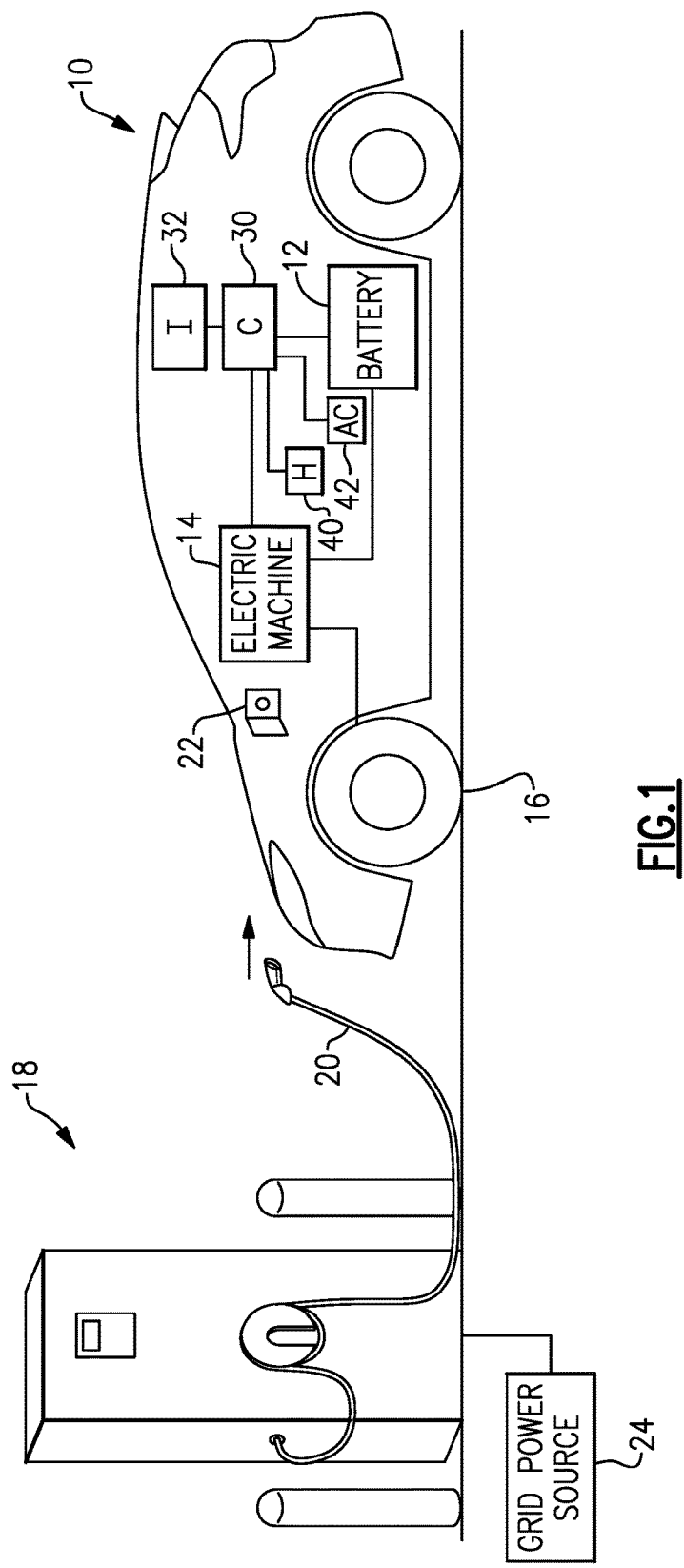
FIG. 1 schematically illustrates an electrified vehicle and a charging station.

FIG. 1 schematically illustrates an example electrified vehicle 10 that includes a battery 12, an electric machine 14, and a pair of wheels 16. The electric machine 14 can receive electric power from the battery 12. The electric machine 14 converts the electric power to torque that drives the wheels 16. The battery 12 is a high voltage traction battery in some embodiments.

The example electrified vehicle 10 is an all-electric vehicle, i.e. a battery electric vehicle (BEV). In other examples, the electrified vehicle 10 is a hybrid electric vehicle or plug-in hybrid electric vehicle (PHEV), which can selectively drive the wheels 16 with torque provided by an internal combustion engine instead of, or in addition to, the electric machine. Other electrified vehicles with a fuel cell where thermal management is also important.

The battery 12 will periodically require recharging. A charging station 18 can provide power to recharge the battery 12. The charging station 18 includes a cord set 20 that can engage a port 22 of the electrified vehicle 10 to electrically couple the electrified vehicle 10 to the charging station 18. When the electrified vehicle 10 and the charging station 18 are electrically coupled, power can move from a grid power source 24 to the electrified vehicle 10. The power from the grid power source 24 recharges the battery 12.

The example electrified vehicle 10 includes a system to control operation of the battery 12 and electric machine 14, as well as to interface with an operator of the vehicle 10. The system includes a controller 30 and an operator interface 32 that communicate with each other. The controller 30 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory that may include one or more separate programs, each of which includes an ordered listing of executable instructions for implementing logical functions. The controller 30 can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

The interface 32 can include various input and output devices that may communicate with the controller input and output interfaces. The interface 32, for example, may be a touch screen within the vehicle 10 via which information can be communicated to the operator or through which the operator can communicate to the controller 30. In additional, the interface 32 may also include a wireless communication interface where the vehicle controller 30 and operator can communicate via a mobile device such as a smart phone or tablet, or an internet browser for example.

The battery 12 is an exemplary electrified vehicle battery. The battery 12 may be a high voltage traction battery pack that includes a plurality of battery assemblies (i.e., battery arrays or groupings of battery cells) capable of outputting electrical power to operate the electric machine 14. In one non-limiting embodiment, the electrified vehicle 10 operates in an Electric Vehicle (EV) mode where the electric machine 14 is used for vehicle propulsion, thereby depleting the battery 12 state of charge up to its minimum allowable value under certain driving patterns/cycles.

In one example, when the vehicle is not in use, the operator preferably places the cord 20 in the charge port 22 such that the charging station 18 can replenish the depleted battery power. Optionally, there are wireless charging systems that do not require a plug connection for charging. However, often during usage, the vehicle 10 is parked at a location that does not include a charging station, which means the vehicle is off charge.

Figure 2:
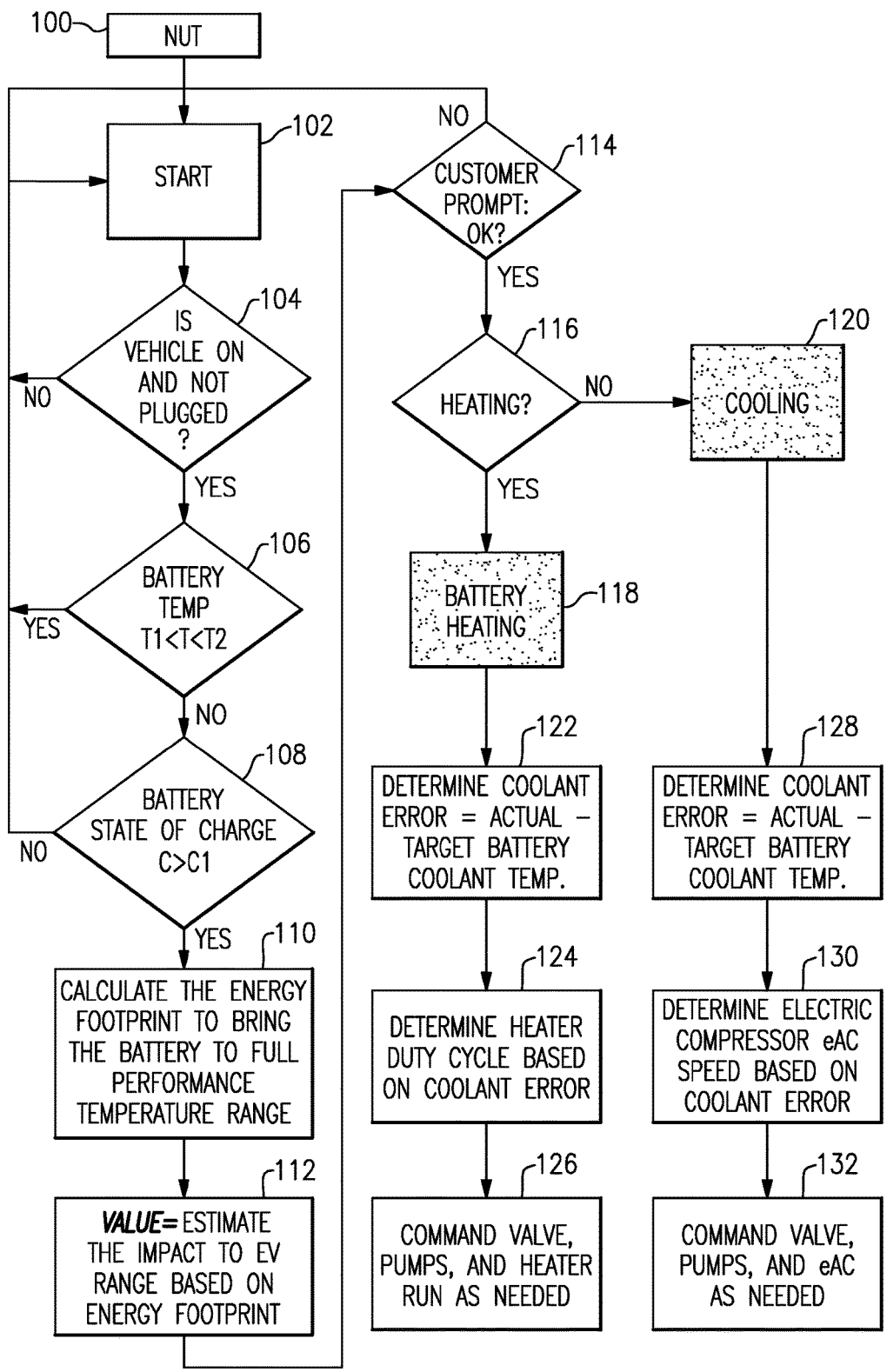
FIG. 2 is flow diagram showing a method for preconditioning a battery for an electrified vehicle while off charge.

As discussed above, one exemplary method of the disclosure is directed toward a method of conditioning the battery 12 for a BEV 10 to allow an operator to select a mode that provides greater vehicle performance as a tradeoff for decreased range. In one example, the controller 30 determines a state of the battery to determine an amount of energy that is required to bring the battery to a desired level of performance capability. In one example, the state of the battery is determined based on the battery state of charge and/or a battery temperature. The desired level of performance can be based on a desired speed capability, acceleration capability, etc. for example. As shown in FIG. 2, the controller 30 first detects when a next usage time (NUT) or go time is available as indicated at 100. In one example, an operator communicates with the controller 30 via the interface 32 to identify one or more go times/NUTs that are scheduled for the vehicle 10 each day or for a plurality of days. When the vehicle is charging, the controller 30 can then initiate battery heating or cooling based on when the operator is scheduled to use the vehicle next, such that desired levels of vehicle performance can be achieved. However, if the next usage time occurs while the vehicle is not charging, then the controller 30 traditionally does not initiate battery heating or cooling for improved performance as this could adversely affect vehicle range.

However, as the range for BEVs 10 continues to be extended, it is desirable to provide operators with a choice to have increased performance rather than increased range. Once it has been determined that the next usage time occurs while the vehicle is not charging, the controller 30 starts an analysis to determine whether the battery can be conditioned as indicated at 102. The method first determines if the vehicle 10 is in an off charge condition as indicated at 104. If the vehicle is off charge, the controller 30 then determines a current state of the battery 12. For example, controller 30 determines if the available power from the battery 12 is limited due to the current temperature of the battery 12 as indicated at 106. In one example, there are two temperature thresholds for step 106, which include a first threshold T1 below which the battery would need heating, and a second threshold T2 above which the battery needs cooling. Note that T1 is lower temperature value than T2. In other words, if the battery temperature is between the two thresholds no thermal management/conditioning is required. The controller 30 may also determine if the available energy from the battery 12 is limited due to the battery state of charge C, as indicated at 108, where the state of charge C has to be greater than a threshold C1. In other words, the current battery temperature and the current state of charge are compared to respective thresholds to determine whether conditioning would be required to place the battery in an appropriate condition to provide the desired performance level at the next "go time."

If the controller 30 determines that the battery temperature meets threshold requirements, and that the battery state of charge meets the threshold, then conditioning can be done as the current state of the battery is sufficient for the desired level of performance. For example, if a determination is made that the battery temperature is within the predetermined temperature range bounded by T1 and T2, and the battery state of charge is higher than a predetermined state of charge threshold C1, a determination is made as to the amount of energy that would be required to place the battery 12 in a condition to provide the desired level of performance as indicated at 110. In one example, the amount of energy required is based on providing a full or maximum level of performance for the vehicle. In another example, a plurality of performance levels are identified and amounts of energy are determined for each level of performance.

Based on this determination, controller 30 will estimate the remaining range of the vehicle 10 if the battery 12 was to be conditioned for the desired increased performance level as indicated at 112. For example, the controller 30 will determine the current available range and the estimated impact to the range, i.e. the amount of range reduction, which will result if conditioning is selected by the operator. The controller 30 will then prompt the operator, as indicated at 114, to select between conditioning the battery 12 to a limited or increased performance mode in light of the estimated impact to vehicle range. The controller 30 does this by communicating information to the operator via the interface 32. In one example, the information includes the amount of the range reduction and the range that would be available if conditioning the battery 12 were to occur.

If the operator affirmatively selects the increased performance level as a tradeoff for decreased range, the controller 30 will then determine the temperature at which the battery 12 needs to be in order to achieve the desired performance level as indicated at 116. In one example, the vehicle includes a heating system 40 and a cooling system 42 (FIG. 1) which are controlled by the controller 30. If heating is required, the controller 30 will issue a control signal to activate the heating system 40 as indicated at 118 in FIG. 2. If cooling is required, the controller 30 will issue a control signal to activate the cooling system 42 as indicated at 120. The battery 12 is then subsequently cooled or heated until the desired temperature range is achieved. Any type of heating or cooling system can be used to heat/cool the battery 12.

If heating is required, the controller 30 will identify a target battery cooling temperature as indicated at 122. The controller 30 will then determine a heater duty cycle to achieve the target battery coolant temperature as indicated at 124. The controller 30 will then issue control signals to control valve(s), pump(s), and/or other heating system components to perform the heater duty cycle as indicated at 126.

If cooling is required, the controller 30 will identify a target battery coolant temperature as indicated at 128. The controller 30 will then determine a cooling duty cycle to achieve the target battery coolant temperature as indicated at 130. The controller 30 will then issue control signals to control valve(s), pump(s), and/or other air conditioner system components to perform the cooling duty cycle as indicated at 132.

This method is useful for situations when the vehicle is located in a high temperature or low temperature environment for a significant time while off charge. For example, if the operator drives to an airport for a trip, the vehicle may be in an off charge condition for several days. The operator may have communicated to the controller 30 the estimated go time/NUT for when the operator is returning from the trip. The controller 30 can then, based on this go time/NUT, determine the current state of the battery and offer the operator a choice of having an increased performance level available.

In this example, the operator may have indicated that the operator is planning to return to home upon arrival at the airport. If the vehicle has been in an extremely cold environment for several days, the controller 30 can then determine the energy that would be required to heat the battery to place the battery within a temperature range to provide one or more various levels of performance. The controller 30 can also determine the impact to the range that would result from the energy required to thermally condition the battery. The controller can then communicate to the operator how much range would be available for each level of performance and allow the user to approve or disapprove of the condition strategy.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   determining if a next usage time occurs while an electrified vehicle is off charge;
   offering a choice between a limited performance mode and an increased performance mode in light of an estimated reduction to a current available range for the next usage time; and
   using a controller to condition the battery of the electrified vehicle while off charge in response to an operator request for the increased performance mode.

2. The method as recited in claim 1, comprising:
   determining the current available range of the electrified vehicle;
   estimating a deceased range in relation to the currant available range for the increased performance mode; and
   determining a state of the battery to determine an amount of energy required to bring the battery to the increased level of performance capability.

3. The method as recited in claim 2, comprising:
   comparing at least one of battery temperature and battery state of charge to a threshold to determine the state of the battery.

4. The method as recited in claim 2, comprising:
   providing at least one increased level of performance capability to be selected by an operator for the increased performance mode,
   determining if the at least one increased level of performance capability will reduce the current available range; and
   estimating the impact to the current available range based on the amount of energy required to bring the battery to the increased level of performance capability.

5. The method as recited in claim 4, comprising:
   communicating to the operator an estimated range available for the increased performance mode if the battery is conditioned to the increased level of performance capability.

6. The method as recited in claim 4, wherein the estimating step includes:
   defining the at least one increased level of performance capability as a plurality of increased levels of performance capability and estimating an impact to range for each increased level of performance capability based on the amount of energy required to bring the battery to each increased level of performance capability.

7. The method as recited in claim 6, comprising:
   communicating to the operator an estimated range available for each increased level of performance capability.

8. The method as recited in claim 4, comprising:
   conditioning the battery in response to an affirmative operator request for the increased performance mode.

9. The method as recited in claim 8, wherein the conditioning step includes:
   heating or cooling the battery.

10. The method as recited in claim 1, wherein the electrified vehicle comprises a battery electric vehicle or plug-in hybrid electric vehicle.

11. A method, comprising
    determining if a next usage time occurs while an electrified vehicle is off charge;
    determining a current available range of the electrified vehicle;
    estimating am impact to the current available range for an increased level of performance capability;
    offering an operator a choice between a limited performance mode and an increased performance mode in light of an estimated impact to the current available range; and
    generating an operator prompt to allow the operator to approve conditioning a battery of the electrified vehicle via a controller to achieve increased performance mode while the electrified vehicle is off charge.

12. The method as recited in claim 11, comprising:
    determining a state of the battery to determine an amount of energy required to bring the battery to the increased level of performance capability.

13. The method as recited in claim 12, comprising:
    comparing at least one of a battery temperature and battery state of charge to a threshold to determine the state of the battery.

14. The method as recited in claim 12, comprising:
    providing at least one increased level of performance capability to be selected by the operator for the increased performance mode,
    determining if the at least one increased level of performance capability will reduce the current available range; and
    estimating an impact to the current available range based on the amount of energy needed to condition the battery.

15. The method as recited in claim 14, comprising:
    communicating to the operator an estimated range available for the increased performance mode if the battery is conditioned to the increased level of performance capability.

16. The method as recited in claim 15, comprising:
    conditioning the battery in response to an affirmative operator request for the increased performance mode.

17. An electrified vehicle system comprising:
    a battery,
    an electric machine configured to receive electric power from the battery to drive vehicle wheels, and
    a system control that
    determines if a next usage time occurs while the electric machine is off charge,
    offers a choice between a limited performance mode and an increased performance mode in light of an estimated impact to current available range, and
    generates a control signal to condition the battery while off charge in response to an operator request for the increased performance mode.

18. The system as recited in claim 17, comprising:
    an interface configured to allow the operator to communicate a usage schedule to the system control, and wherein the system control is configured to
    determine a current available range of the electrified vehicle for the next usage time,
    estimate an impact to the current available range for an increased level of performance capability associated with the increased performance mode to define a decreased range,
    and
    generate an operator prompt to allow the operator to select the increased performance mode in light of the decreased range.

19. The system as recited in claim 18, wherein:

the system control determines a state of the battery to determine an amount of energy required to bring the battery to the increased level of performance capability, estimates the impact to the current available range based on the amount of energy required to condition the battery, and communicates to the operator the decreased range if the battery is conditioned to the increased level of performance capability.

20. The system as recited in claim 19, comprising a heating system and a cooling system wherein, in response to an operator selection of the increased performance capability, the system control is configured to activate the heating or cooling system while off charge to place a temperature of the battery within a desired range to achieve the increased level of performance capability for the next usage time.

21. The system as recited in claim 18, wherein:

the system control provides at least one increased level of performance capability to be selected by the operator for the increased performance mode, determines if the at least one increased level of performance capability will reduce the current available range, and estimates the impact to the current available range based on an amount of energy required to bring the battery to the increased level of performance capability.

22. The system as recited in claim 21, wherein:

the system control defines the at least one increased level of performance capability as a plurality of increased levels of performance capability and estimates an impact to the current available range for each increased level of performance capability based on the amount of energy required to bring the battery to each increased level of performance capability.

* * * * *